United States Patent
Yoshikawa et al.

(10) Patent No.: US 11,448,917 B2
(45) Date of Patent: Sep. 20, 2022

(54) LIQUID CRYSTAL DISPLAY DEVICE

(71) Applicant: NITTO DENKO CORPORATION, Ibaraki (JP)

(72) Inventors: Jin Yoshikawa, Ibaraki (JP); Hiroyuki Takemoto, Ibaraki (JP); Mariko Hirai, Ibaraki (JP); Masanori Otsuka, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/050,900

(22) PCT Filed: Apr. 12, 2019

(86) PCT No.: PCT/JP2019/015930
§ 371 (c)(1),
(2) Date: Oct. 27, 2020

(87) PCT Pub. No.: WO2019/208263
PCT Pub. Date: Oct. 31, 2019

(65) Prior Publication Data
US 2021/0231988 A1    Jul. 29, 2021

(30) Foreign Application Priority Data
Apr. 27, 2018 (JP) .............................. JP2018-087511

(51) Int. Cl.
*G02F 1/1334* (2006.01)
*C09K 19/54* (2006.01)
(Continued)

(52) U.S. Cl.
CPC .......... *G02F 1/1334* (2013.01); *C09K 19/544* (2013.01); *G02F 1/1323* (2013.01);
(Continued)

(58) Field of Classification Search
CPC .. G02F 1/1323; G02F 1/1347; G02F 1/13471; G02F 1/13476
See application file for complete search history.

(56) References Cited

U.S. PATENT DOCUMENTS 5,877,829 A * 3/1999 Okamoto .............. G02F 1/1347
349/74
7,621,665 B2   11/2009 Uehara et al.
(Continued)

FOREIGN PATENT DOCUMENTS

JP   2006-277999 A    10/2006
JP   2006-310085 A    11/2006
(Continued)

OTHER PUBLICATIONS

International Search Report dated Jul. 2, 2019, issued in counterpart International Application No. PCT/JP2019/015930 (2 pages).

*Primary Examiner* — Alexander P Gross
(74) *Attorney, Agent, or Firm* — WHDA, LLP (57) ABSTRACT

The liquid crystal display apparatus includes: a liquid crystal panel; a light control layer; and a surface light source device, wherein the liquid crystal panel includes: a liquid crystal cell; a viewer-side polarizing plate; and a back surface-side polarizing plate, wherein the light control layer includes a first transparent substrate; a first transparent electrode layer; a composite layer of a polymer matrix and a liquid crystal compound; a second transparent electrode layer; and a second transparent substrate, wherein the first transparent substrate and the second transparent substrate each independently have a thickness of 70 μm or less, wherein the first transparent substrate and the second transparent substrate each independently have a front retardation at a wavelength of 590 nm of 100 nm or less, wherein the surface light source (Continued)

device is configured to emit light which has directivity in an approximately normal direction of the light emitting surface.

11 Claims, 3 Drawing Sheets

(51) Int. Cl.
  *G02F 1/13* (2006.01)
  *G02F 1/1335* (2006.01)
  *G02F 1/13357* (2006.01)
  *G02F 1/13363* (2006.01)
  *G02F 1/1343* (2006.01)
  *G02F 1/1347* (2006.01)

(52) U.S. Cl.
  CPC .... *G02F 1/13362* (2013.01); *G02F 1/133524* (2013.01); *G02F 1/133528* (2013.01); *G02F 1/133634* (2013.01); *G02F 1/134309* (2013.01); *G02F 1/13476* (2013.01)

(56) References Cited

U.S. PATENT DOCUMENTS

| | | | |
|---|---|---|---|
| 8,493,526 | B2 | 7/2013 | Uchida et al. |
| 9,513,487 | B2 | 12/2016 | Shinkai et al. |
| 10,747,040 | B2 | 8/2020 | Liu et al. |
| 2006/0227569 | A1 | 10/2006 | Uehara et al. |
| 2011/0249221 | A1 | 10/2011 | Uchida et al. |
| 2014/0036176 | A1 | 2/2014 | Shinkai et al. |
| 2014/0192277 | A1* | 7/2014 | Yilmaz ............... G02B 1/04 349/12 |
| 2015/0301384 | A1* | 10/2015 | Koike ............ G02F 1/13362 349/65 |
| 2018/0373068 | A1* | 12/2018 | Lim ............... G02F 1/13725 |
| 2019/0129218 | A1 | 5/2019 | Liu et al. |
| 2019/0353943 | A1* | 11/2019 | Smith ............ G02F 1/133514 |

FOREIGN PATENT DOCUMENTS

| | | |
|---|---|---|
| JP | 2007-33813 A | 2/2007 |
| JP | 2012-151081 A | 8/2012 |
| JP | 2017-97236 A | 6/2017 |
| WO | 2012/153779 A1 | 11/2012 |
| WO | 2017/033496 A1 | 3/2017 |
| WO | 2017/205097 A1 | 11/2017 |

* cited by examiner

LIQUID CRYSTAL DISPLAY DEVICE

TECHNICAL FIELD

The present invention relates to a liquid crystal display apparatus.

BACKGROUND ART

Typically, liquid crystal display apparatus are required to have a wide viewing angle when used in scenes where a viewer position is not fixed and the apparatus are viewed from every angle (for example, in electronic advertisement and in television sets and personal computers for normal uses). To accomplish a wide viewing angle, various technologies using a diffusion sheet, a prism sheet, a wide viewing angle liquid crystal panel, a wide viewing angle polarizing plate, and the like are being investigated. Meanwhile, liquid crystal display apparatus capable of displaying an image at a narrow viewing angle (for example, liquid crystal display apparatus for use in cellular phones, notebook computers used in public places, automated teller machines, and seat monitors on rides) are also required for the prevention of screen peeking and other purposes when the viewer position is limited within a narrow range.

In Patent Literature 1, as a liquid crystal display apparatus capable of switching between a wide viewing angle and a narrow viewing angle, there has been proposed a liquid crystal display apparatus including a liquid crystal panel, viewing angle control means, a prism sheet, and a light guide plate in the stated order from a viewer side. In the liquid crystal display apparatus of Patent Literature 1, the prism sheet condenses light emitted from the light guide plate to the viewing angle control means, and the viewing angle control means changes the transmission state of the light, thereby being capable of controlling the widening and narrowing of the viewing angle.

As the viewing angle control means, there may be used a light control layer including a pair of substrates with transparent electrode layers and a composite layer, which is interposed therebetween and contains a polymer matrix and a liquid crystal compound (for example, Patent Literature 2).

Meanwhile, as a demand for general liquid crystal display apparatus, further thinning is required. In particular, there is an increasing demand for thinning in a notebook computer and the like from the viewpoint of improving portability.

CITATION LIST

Patent Literature

[PTL 1] JP 2006-310085 A
[PTL 2] JP 2006-277999 A

SUMMARY OF INVENTION

Technical Problem

The inventors of the present invention have made an attempt to further reduce the thickness in a liquid crystal display apparatus capable of switching between a wide viewing angle and a narrow viewing angle through thinning of a light control layer (viewing angle control means) that is a constituent member, and have found that color unevenness may occur at the time of narrow viewing angle setting.

The present invention has been made in order to solve the above-mentioned problem newly found in a liquid crystal display apparatus capable of switching between a wide viewing angle and a narrow viewing angle, and an object of the present invention is to provide a liquid crystal display apparatus which is capable of switching between a wide viewing angle and a narrow viewing angle and is capable of achieving both thinning and suppression of color unevenness at the time of narrow viewing angle setting.

Solution to Problem

According to one embodiment of the present invention, there is provided a liquid crystal display apparatus, including in an order from a viewer side: a liquid crystal panel; a light control layer; and a surface light source device, wherein the liquid crystal panel includes: a liquid crystal cell; a viewer-side polarizing plate arranged on the viewer side of the liquid crystal cell; and aback surface-side polarizing plate arranged on an opposite side to the viewer side of the liquid crystal cell, wherein the light control layer includes in an order from the viewer side: a first transparent substrate; a first transparent electrode layer; a composite layer of a polymer matrix and a liquid crystal compound; a second transparent electrode layer; and a second transparent substrate, wherein the first transparent substrate and the second transparent substrate each independently have a thickness of 70 μm or less, wherein the first transparent substrate and the second transparent substrate each independently have a front retardation at a wavelength of 590 nm of 100 nm or less, wherein the surface light source device is configured to emit, from a light emitting surface opposed to the light control layer, light which has directivity in an approximately normal direction of the light emitting surface, and which contains a linearly polarized light component that vibrates in a specific direction at a high ratio, and wherein a vibration direction of the linearly polarized light component is approximately parallel to a transmission axis of the back surface-side polarizing plate.

In one embodiment, the first transparent substrate and the second transparent substrate are each formed of a material containing a cycloolefin-based resin.

In one embodiment, a driving mode of the liquid crystal cell is an IPS mode or an FFS mode.

In one embodiment, the surface light source device includes a light source unit, and a light guide plate configured to cause light from the light source unit to enter from a side surface opposed to the light source unit, and to emit the light from a viewer-side surface, and the linearly polarized light component vibrates in a plane approximately parallel to a light guide direction of the light of the light guide plate.

Advantageous Effects of Invention

According to the present invention, through use of the light control layer including the thin transparent substrate having a front retardation value that is a predetermined value or less, the liquid crystal display apparatus, which is capable of switching between a wide viewing angle and a narrow viewing angle, and in which the problem of color unevenness at the time of narrow viewing angle setting is suppressed in spite of thinness, is obtained.

DESCRIPTION OF EMBODIMENTS

Now, embodiments of the present invention are described with reference to the drawings, but the present invention is not limited to these embodiments. As used herein, a first transparent substrate and a second transparent substrate are sometimes collectively referred to as "transparent substrate", and a first transparent electrode layer and a second transparent electrode layer are sometimes collectively referred to as "transparent electrode layer". In addition, a laminate including the transparent substrate and the transparent electrode layer is sometimes referred to as "transparent conductive film".

Definitions of Terms and Symbols

The definitions of terms and symbols as used herein are as follows.
(1) Refractive Index (nx, ny, nz)
"nx" represents a refractive index in a direction in which an in-plane refractive index is maximum (that is, a slow axis direction), "ny" represents a refractive index in a direction perpendicular to the slow axis in the plane, and "nz" represents a refractive index in a thickness direction.
(2) Front Retardation Value
A front retardation value (Re[$\lambda$]) refers to an in-plane retardation value of a film at 23° C. and a wavelength $\lambda$ (nm). Re[$\lambda$] is obtained by Re[$\lambda$]=(nx−ny)×d, where d (nm) represents the thickness of the film.
(3) The expression "substantially parallel" or "approximately parallel" as used herein includes a case of 0°±5.0° unless otherwise specified, preferably 0°±3.0°, more preferably 0°±1.0°.
(4) The expression "substantially perpendicular" or "approximately perpendicular" as used herein includes a case of 90°±5.0° unless otherwise specified, preferably 90°±3.0°, more preferably 90°±1.0°.
(5) The simple expression "perpendicular" or "parallel" as used herein may include a substantially perpendicular state or a substantially parallel state.

A. Overall Configuration of Liquid Crystal Display Apparatus

Figure 1:
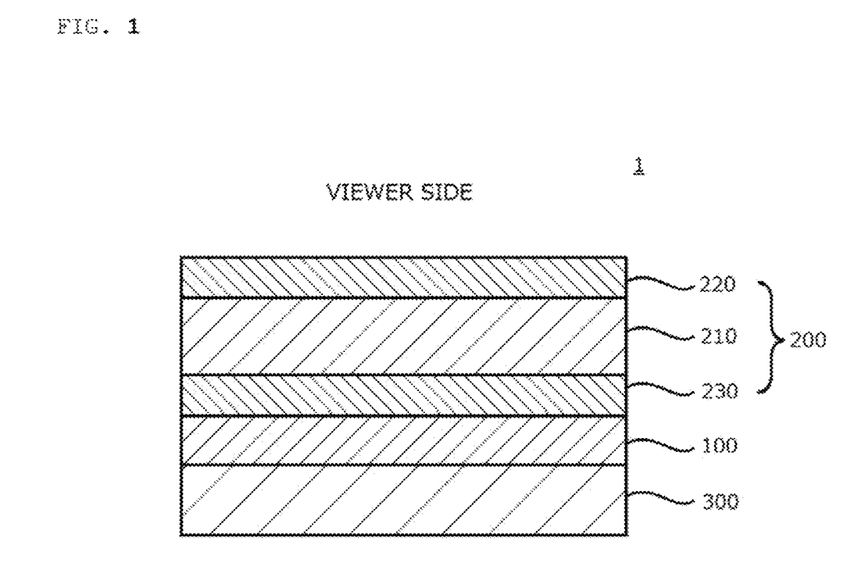
FIG. 1 is a schematic sectional view of a liquid crystal display apparatus according to one embodiment of the present invention.

FIG. 1 is a view for illustrating a liquid crystal display apparatus 1 according to one embodiment of the present invention. The liquid crystal display apparatus 1 according to this embodiment includes a liquid crystal panel 200, a light control layer 100, and a surface light source device 300 in the stated order from a viewer side. Although description and the like are omitted, the liquid crystal display apparatus 1 includes, in addition to the above, devices such as ordinary wiring, circuits, and members required for operating the liquid crystal display apparatus.

In the liquid crystal display apparatus 1, the light control layer 100 is configured to control the widening and narrowing of a viewing angle by changing the scattering state of light from the surface light source device 300.

B. Liquid Crystal Panel

The liquid crystal panel 200 typically includes a liquid crystal cell 210, a viewer-side polarizing plate 220, which is arranged on the viewer side of the liquid crystal cell, and a back surface-side polarizing plate 230, which is arranged on an opposite side to the viewer side (back surface side) of the liquid crystal cell. The viewer-side polarizing plate and the back surface-side polarizing plate may be arranged so that the absorption axes thereof are substantially perpendicular or parallel to each other.

The liquid crystal cell includes a pair of substrates and a liquid crystal layer as a display medium sandwiched between the substrates. In a general configuration, on one of the substrates, a color filter and a black matrix are arranged, and on the other substrate, there are arranged switching elements for controlling the electro-optical property of the liquid crystal, scanning lines for giving gate signals to the switching elements and signal lines for giving source signals thereto, and pixel electrodes and a counter electrode. An interval (cell gap) between the substrates may be controlled by spacers and the like. On sides of the substrates, which are brought into contact with the liquid crystal layer, for example, alignment films made of polyimide or the like may be formed.

In one embodiment, the liquid crystal layer includes liquid crystal molecules aligned in a homogeneous alignment under a state in which no electric field is present. The liquid crystal layer (as a result, liquid crystal cell) as described above typically exhibits a three-dimensional refractive index of nx>ny=nz. Herein, ny=nz includes not only a case in which ny and nz are completely the same, but also a case in which ny and nz are substantially the same. As a typical example of a driving mode using the liquid crystal layer that exhibits the three-dimensional refractive index as described above, there are given, for example, an in-plane switching (IPS) mode and a fringe field switching (FFS) mode. The IPS mode includes a super in-plane switching (S-IPS) mode and an advanced super in-plane switching (AS-IPS) mode, each of which employs a V-shaped electrode, a zigzag electrode, or the like. In addition, the FFS mode includes an advanced fringe field switching (A-FFS) mode and a ultra fringe field switching (U-FFS) mode, each of which employs a V-shaped electrode, a zigzag electrode, or the like.

In another embodiment, the liquid crystal layer includes liquid crystal molecules aligned in a homeotropic alignment under a state in which no electric field is present. The liquid crystal layer (as a result, liquid crystal cell) as described above typically exhibits a three-dimensional refractive index of nz>nx=ny. As a driving mode using the liquid crystal molecules aligned in the homeotropic alignment under the state in which no electric field is present, there is given, for example, a vertical alignment (VA) mode. The VA mode includes a multi-domain VA (MVA) mode.

The viewer-side polarizing plate and the back surface-side polarizing plate each typically include a polarizer and a protective layer arranged on at least one side of the polarizes. The polarizer is typically an absorption-type polarizer.

The transmittance of the absorption-type polarizer (also referred to as single layer transmittance) at a wavelength of 589 nm is preferably 41% or more, more preferably 42% or more. The theoretical upper limit of the single layer transmittance is 50%. In addition, the polarization degree thereof is preferably from 99.5% to 100%, more preferably from 99.9% to 100%. As long as the polarization degree falls within the above-mentioned ranges, contrast in the front direction can be further increased when the polarizer is used in a liquid crystal display apparatus.

Any appropriate polarizes may be adopted as the polarizer. Examples thereof include a polarizer obtained by uniaxially stretching a hydrophilic polymer film such as a polyvinyl alcohol-based film, a partially formalized polyvinyl alcohol-based film, or an ethylene-vinyl acetate copolymer-based partially saponified film on which a dichroic substance, such as iodine or a dichroic dye, has been adsorbed, and a polyene-based alignment film, such as a product obtained by subjecting polyvinyl alcohol to dehydration treatment or a product obtained by subjecting polyvinyl chloride to dehydrochlorination treatment. Of those, a polarizer obtained by uniaxially stretching a polyvinyl alcohol-based film on which a dichroic substance, such as iodine, has been adsorbed is particularly preferred for its high polarized dichroic ratio. The thickness of the polarizer is preferably from 0.5 µm to 80 µm.

The polarizer obtained by uniaxially stretching a polyvinyl alcohol-based film on which iodine has been adsorbed is typically produced by: immersing polyvinyl alcohol-based film in an aqueous solution of iodine to dye the polyvinyl alcohol-based film; and stretching the dyed polyvinyl alcohol-based film so that the polyvinyl alcohol-based film has a length 3 times to 7 times as long as its original length. The stretching may be performed after the dyeing, the stretching may be performed while the dyeing is performed, or the dyeing may be performed after the stretching. The polarizer is produced through treatment, such as swelling, cross-linking, adjustment, water washing, or drying, in addition to the stretching and the dyeing.

Any appropriate film is used as the protective layer. Specific examples of a material serving as a main component of such film include: cellulose-based resins, such as triacetylcellulose (TAC); and transparent resins, such as a (meth)acrylic resin, a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, and an acetate-based resin. Another example thereof is a thermosetting resin or a UV-curable resin, such as an acrylic resin, a urethane-based resin, an acrylic urethane-based resin, an epoxy-based resin, or a silicone-based resin. Still another example thereof is a glassy polymer, such as a siloxane-based polymer. In addition, a polymer film described in JP 2001-343529 A (WO 01/37007 A1) may also be used. As a material for the film, for example, there may be used a resin composition containing a thermoplastic resin having a substituted or unsubstituted imide group in a side chain and a thermoplastic resin having a substituted or unsubstituted phenyl group and a nitrile group in a side chain. An example thereof is a resin composition containing an alternate copolymer formed of isobutene and N-methylmaleimide and an acrylonitrile-styrene copolymer. The polymer film may be, for example, an extruded product of the resin composition.

C. Light Control Layer

Figure 2:
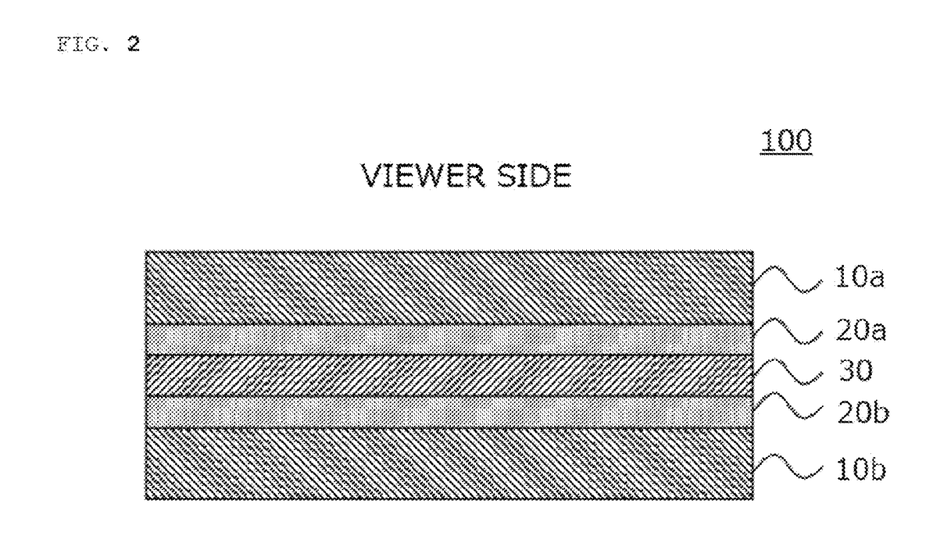
FIG. 2 is a schematic sectional view for illustrating a light control layer that may be used in the liquid crystal display apparatus according to the one embodiment of the present invention.

FIG. 2 is a schematic sectional view of the light control layer to be used in the liquid crystal display apparatus according to one embodiment of the present invention. The light control layer 100 includes a first transparent substrate 10a, a first transparent electrode layer 20a, a composite layer 30, a second transparent electrode layer 20b, and a second transparent substrate 10b in the stated order from the viewer side. Although not shown, refractive index adjusting layers may be formed between the first transparent substrate 10a and the first transparent electrode layer 20a and between the second transparent substrate 10b and the second transparent electrode layer 20b, respectively. In the same manner, an antireflection layer may be formed on an outer side of the first transparent substrate 10a (in other words, on an opposite side to a side on which the first transparent electrode layer 20a is arranged) and/or on an outer side of the second transparent substrate 10b (in other words, on an opposite side to a side on which the second transparent electrode layer 20b is arranged). Through formation of the refractive index adjusting layer and/or the antireflection layer, the light control layer having a high transmittance may be obtained.

The light control layer may have a haze of preferably 15% or less, more preferably 10% or less in a light transmitting state. When the haze in the light transmitting state falls within the above-mentioned ranges, light having directivity, which has entered from the back surface side, can be transmitted while maintaining the directivity thereof, and hence a narrow viewing angle can be suitably achieved.

The light control layer may have a haze of preferably 30% or more, more preferably from 50% to 99% in a light scattering state. When the haze in the light scattering state falls within the above-mentioned ranges, light having directivity, which has entered from the back surface side, is scattered, and hence a wide viewing angle can be suitably achieved.

As described later, the scattering state of the light transmitted through the light control layer (as a result, haze) changes depending on a voltage to be applied. Herein, the case in which the haze of the light control layer is a predetermined value or more (for example, 30% or more, preferably 50% or more) may be defined as the light scattering state, and the case in which the haze is less than the predetermined value (for example, 15% or less, preferably 10% or less) may be defined as the light transmitting state.

The light control layer has a parallel light transmittance of preferably from 80% to 99%, more preferably from 83% to 99% in the light transmitting state. When the parallel light transmittance in the light transmitting state falls within the above-mentioned ranges, light having directivity, which has entered from the back surface side, can be transmitted while the directivity is maintained. Therefore, a narrow viewing angle can be suitably achieved.

The light control layer has a total light transmittance of typically from 85% to 99% in the light transmitting state. In addition, the light control layer has a total light transmittance of preferably from 85% to 99%, more preferably from 88% to 95% in both the light transmitting state and the light scattering state. In the case where the total light transmittance falls within the above-mentioned ranges, even when the light control layer is incorporated into a high-definition liquid crystal display apparatus (for example, having a resolution of 150 ppi or more), a wide viewing angle and a narrow viewing angle can be switched while a decrease in brightness is suppressed.

The total thickness of the light control layer is, for example, from 20 µm to 180 µm, preferably from 40 µm to 150 µm.

The front retardations Re[590] at a wavelength of 590 nm of the transparent substrates 10a and 10b are 100 nm or less. As long as the front retardation Re[590] of the transparent substrate is 100 nm or less, even when the thickness of the substrate is reduced, the occurrence of color unevenness can be suppressed. The reason for such an effect is not clear, but may be presumed as follows. Specifically, when the display screen of the liquid crystal display apparatus is observed while the viewing angle is changed from the front direction to an oblique direction, a retardation is also gradually changed from the front retardation. Herein, as described above, the light emitted from the surface light source device has a polarization property. Therefore, when the display screen is observed while the viewing angle is changed toward the oblique direction, the polarization state of the light transmitted through the light control layer is also gradually changed due to a change in retardation of the transparent substrate. As a result, light having a different polarization state is transmitted through the back surface-side polarizing plate, and this light is presumed to be observed as color unevenness. In the present invention, the transparent substrate having a front retardation Re[590] of 100 nm or less is used in order to address the cause for the occurrence of such color unevenness. With this, it is presumed that the polarized light or partially polarized light emitted from the surface light source device is enabled to enter the back surface-side polarizing plate without largely changing the polarization state thereof, with the result that the occurrence of color unevenness can be suppressed. The front retardations Re[590] of the transparent substrates 10a and 10b may be the same or different as long as the front retardations Re[590] are 100 nm or less.

The front retardation Re[590] of the transparent substrate is preferably 50 nm or less, more preferably 20 nm or less, still more preferably 10 nm or less. When the transparent substrate has a front retardation Re[590] within the above-mentioned ranges, color unevenness can be suitably suppressed, and higher brightness can be obtained.

A material for forming the transparent substrate is typically a polymer film containing a thermoplastic resin as a main component. As the thermoplastic resin, from the viewpoint of suitably obtaining the suppression effect of color unevenness, cycloolefin-based resins, such as polynorbornene, polycarbonate resins, and the like are preferably used. Of those, cycloolefin-based resins are preferred.

The polynorbornene refers to a (co)polymer obtained by using a norbornene-based monomer having a norbornene ring as part or the entirety of starting materials (monomers). Examples of the norbornene-based monomer include: norbornene, alkyl and/or alkylidene substituted products thereof, such as 5-methyl-2-norbornene, 5-dimethyl-2-norbornene, 5-ethyl-2-norbornene, 5-butyl-2-norbornene, and 5-ethylidene-2-norbornene, and polar group (e.g., halogen) substituted products thereof; dicyclopentadiene and 2,3-dihydrodicyclopentadiene; dimethanooctahydronaphthalene, alkyl and/or alkylidene substituted products thereof, and polar group (e.g., halogen) substituted products thereof, such as 6-methyl-1,4:5,8-dimethano-1,4,4a, 5,6,7,8,8a-octahydronaphthalene, 6-ethyl-1,4:5,8-dimethano-1,4,4a, 5,6,7,8,8a-octahydronaphthalene, 6-ethylidene-1,4:5,8-dimethano-1,4,4a, 5,6,7,8,8a-octahydronaphthalene, 6-chloro-1,4:5,8-dimethano-1,4,4a, 5,6,7,8,8a-octahydronaphthalene, 6-cyano-1,4:5,8-dimethano-1,4,4a, 5,6,7,8,8a-octahydronaphthalene, 6-pyridyl-1,4:5,8-dimethano-1,4,4a, 5,6,7, 8,8a-octahydronaphthalene, and 6-methoxycarbonyl-1,4:5, 8-dimethano-1,4,4a, 5,6,7,8,8a-octahydronaphthalene; and trimers or tetramers of cyclopentadiene, such as 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11, 11a-dodecahydro-1H-cyclopentaanthracene.

Various products are commercially available as the polynorbornene. Specific examples thereof include products available under the product names "ZEONEX" and "ZEONOR" from Zeon Corporation, a product available under the product name "Arton" from JSR Corporation, a product available under the product name "Topas" from TICONA, and a product available under the product name "APEL" from Mitsui Chemicals, Inc.

The thickness of the transparent substrate is 70 µm or less, preferably from 10 µm to 70 µm, more preferably from 15 µm to 65 µm, still more preferably from 20 µm to 60 µm. When the transparent substrate has a thickness within the above-mentioned ranges, the transparent substrate can contribute to thinning of the liquid crystal display apparatus while functioning as a support substrate of the composite layer.

The transparent electrode layer may be formed, for example, through use of a metal oxide, such as indium tin oxide (ITO), zinc oxide (ZnO), or tin oxide ($SnO_2$). Alternatively, the transparent electrode layer may be formed of a metal nanowire, such as a silver nanowire (AgNW), a carbon nanotube (CNT), an organic conductive film, a metal layer, or a laminate thereof. The transparent electrode layer may be patterned into a desired shape depending on the purpose.

The transparent electrode layer is typically formed through use of sputtering.

The composite layer typically contains a polymer matrix and a liquid crystal compound dispersed in the matrix. In the composite layer, the scattering state of transmitted light is changed by changing the degree of alignment of the liquid crystal compound corresponding to the application amount of a voltage, and with this, the light transmitting state and the light scattering state can be switched.

In one embodiment, the composite layer is in the light transmitting state at the time of application of a voltage, and the composite layer is in the light scattering state at the time of application of no voltage (normal mode). In this embodiment, the liquid crystal compound is not aligned at the time of application of no voltage, resulting in the light scattering state. When a voltage is applied, the liquid crystal compound is aligned, and the refractive index of the liquid crystal compound and the refractive index of the polymer matrix match with each other, resulting in the light transmitting state.

In another embodiment, the composite layer is in the light scattering state at the time of application of a voltage, and the composite layer is in the light transmitting state at the time of application of no voltage (reverse mode). In this embodiment, with an alignment film arranged on a surface of the transparent electrode layer, the liquid crystal compound is aligned at the time of application of no voltage, resulting in the light transmitting state. When a voltage is applied, the alignment of the liquid crystal compound is disturbed, resulting in the light scattering state.

Examples of the composite layer as described above include a composite layer containing a polymer-dispersed liquid crystal and a composite layer containing a polymer-network liquid crystal. The polymer-dispersed liquid crystal has a structure in which a liquid crystal compound in the form of droplets is dispersed in a polymer matrix. The polymer-network liquid crystal has a structure in which a liquid crystal compound is dispersed in a polymer network. The liquid crystal has a continuous phase in the polymer network.

As the liquid crystal compound, any appropriate liquid crystal compound of a non-polymeric type is used. The liquid crystal compound may have positive dielectric anisotropy or negative dielectric anisotropy. Examples of the liquid crystal compound may include nematic, smectic, and cholesteric liquid crystal compounds. A nematic liquid crystal compound is preferably used because excellent transparency can be achieved in the light transmitting state. Examples of the nematic liquid crystal compound include a biphenyl-based compound, a phenyl benzoate-based compound, a cyclohexylbenzene-based compound, an azoxybenzene-based compound, an azobenzene-based compound, an azomethine-based compound, a terphenyl-based compound, a biphenyl benzoate-based compound, a cyclohexylbiphenyl-based compound, a phenylpyridine-based compound, a cyclohexylpyrimidine-based compound, a cholesterol-based compound, and a fluorine-based compound.

A resin for forming the polymer matrix may be appropriately selected depending on, for example, the light transmittance and the refractive index of the liquid crystal compound. The resin may be an optically isotropic resin or may be an optically anisotropic resin. In one embodiment, the resin is an active energy ray-curable resin. For example, a liquid crystal polymer obtained by curing a polymerizable liquid crystal compound, a (meth)acrylic resin, a silicone-based resin, an epoxy-based resin, a fluorine-based resin, a polyester-based resin, and a polyimide resin may be preferably used.

The light control layer may be formed by any appropriate method. For example, a pair of transparent conductive films each including a transparent substrate, a transparent electrode layer formed on one side thereof, and a refractive index adjusting layer and/or an antireflection layer as required is prepared. A composition for forming a composite layer is applied onto the surface of the transparent electrode layer of one of the transparent conductive films, to thereby form an application layer. The other transparent conductive film is laminated on the application layer so that the transparent electrode layer is opposed to the application layer, to thereby form a laminate. The application layer is cured with an active energy ray or heat, thereby being capable of obtaining a light control layer. In this case, the composition for forming a composite layer contains, for example, a monomer (preferably, active energy ray-curable monomer) for forming a polymer matrix and a liquid crystal compound.

Alternatively, a resin for forming a polymer matrix and a liquid crystal compound are dissolved in a common solvent to prepare a solution for forming a composite layer, and the solution for forming a composite layer is applied onto the surface of the transparent electrode layer of the transparent conductive film similar to the above. A solvent is removed by drying to phase-separate the polymer matrix and the liquid crystal (solvent dry phase separation), to thereby form a composite layer. After that, another transparent conductive film is laminated on the composite layer so that the transparent electrode layer is opposed to the composite layer, thereby being capable of obtaining a light control layer. Instead of the solution for forming a composite layer, a liquid crystal emulsion liquid in which a liquid crystal compound is dispersed in a resin solution obtained by dissolving a polymer matrix resin in a solvent or an aqueous resin emulsion liquid obtained by emulsifying a polymer matrix resin may be used.

D. Surface Light Source Device

As a surface light source device, there is used a surface light surface device configured to emit, from a light emitting surface, light which has directivity in an approximately normal direction of the light emitting surface, and which contains a linearly polarized light component that vibrates in a specific direction at a high ratio. When polarized light or partially polarized light having directivity is caused to enter the liquid crystal panel so that the vibration direction thereof (the vibration direction of the electric field) is parallel to the transmission axis of the back surface-side polarizing plate as described above, light use efficiency can be improved, and the viewing angle at the time of narrow viewing angle setting can be further narrowed. Herein, the expression "approximately normal direction" includes a direction within a predetermined angle with respect to the normal direction, for example, a direction within a range of ±10° with respect to the normal direction. In addition, the light "having directivity in an approximately normal direction" refers to light having an intensity distribution in which the peak of a maximum intensity of a brightness intensity distribution is in the approximately normal direction with respect to a light emitting surface in one plane perpendicular to the light emitting surface. For example, it is preferred that the brightness at a polar angle of 40° or more be 2% or less with respect to the brightness in the normal direction (polar angle: 0°), and it is more preferred that the brightness at a polar angle of 50° or more be 1% or less with respect to the brightness in the normal direction (polar angle: 0°). Herein, the polar angle refers to an angle formed by the normal direction (front direction) of the liquid crystal display apparatus and the emitted light from the liquid crystal display apparatus.

The light emitted from the surface light source device may contain the linearly polarized light component that vibrates in a specific direction at a ratio of preferably 52% or more, more preferably 55% or more. The upper limit of the ratio of the linearly polarized light component is ideally 100%, and may be 60% in one embodiment and 57% in another embodiment. The ratio of the linearly polarized light component in the light emitted from the surface light source device may be determined, for example, in accordance with a method described in JP 2013-190778 A.

Figure 3:
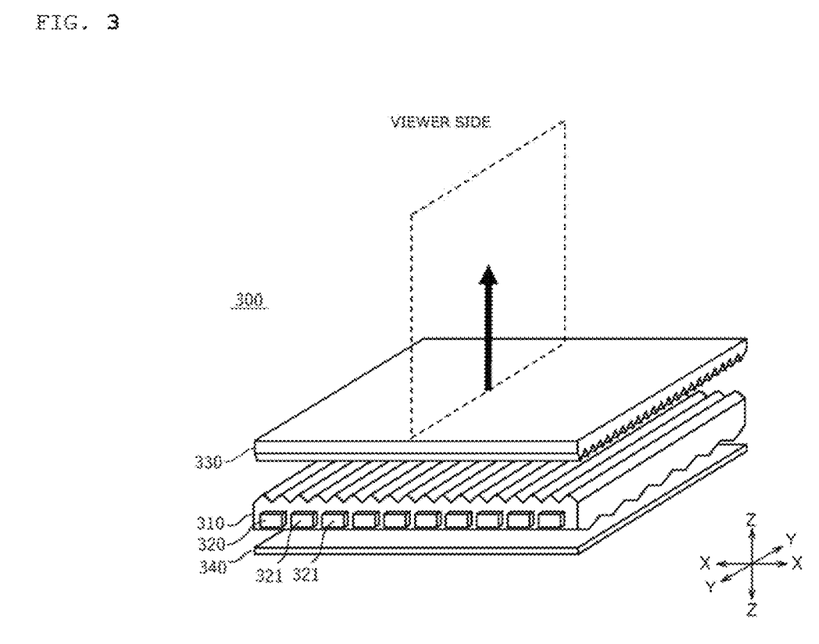
FIG. 3 is a schematic view for illustrating a surface light source device that may be used in the liquid crystal display apparatus according to the one embodiment of the present invention.

FIG. 3 is a schematic view for illustrating an example of a surface light source device configured to emit, from a light emitting surface, light which has directivity in an approximately normal direction of the light emitting surface, and which contains a linearly polarized light component that vibrates in a specific direction at a high ratio. The surface light source device 300 illustrated in FIG. 3 includes a light guide plate 310 which is configured to cause light to enter from a side surface, and to emit the light from a viewer-side surface; a light source unit 320 which includes a plurality of point light sources 321 arranged at predetermined intervals along the side surface (light incident surface) of the light guide plate 310; a prism sheet 330 which is arranged on the viewer side of the light guide plate 310, and has convex portions on a back surface side; and a reflecting plate 340 which is arranged on the back surface side of the light guide plate 310. In the surface light source device 300, the light guide plate 310 is configured to deflect light from a lateral direction in a thickness direction, and to emit the light as light containing a linearly polarized light component that vibrates in a specific direction at a high ratio. The prism sheet 330 having the convex portions on the back surface side can bring the traveling direction of the light close to the normal direction of the light emitting surface without substantially changing the polarization state of the light.

The linearly polarized light component that vibrates in a specific direction may be, for example, a polarized light component (for example, a P-polarized light component) that vibrates in a plane approximately parallel to the light guide direction of light of the light guide plate or a polarized light component (for example, an S-polarized light component) that vibrates in a direction perpendicular to the plane, and is more preferably the P-polarized light component. When the light having directivity and containing the P-polarized light component at a high ratio is caused to enter the liquid crystal panel with the vibration direction of the P-polarized light component being matched with the transmission axis direction of the back surface-side polarizing plate, the viewing angle at the time of narrow viewing angle setting can be further narrowed as compared to the case of using light containing the S-polarized light component at a high ratio. In the present invention, a light control layer formed through use of a transparent substrate which has a small front retardation and is thin is used. Therefore, the light emitted from the surface light source device can be caused to enter the liquid crystal panel without largely changing the polarization state thereof. With this, both thinning and suppression of color unevenness at the time of narrow viewing angle setting can be achieved.

In FIG. 3, when the direction perpendicular to the light guide direction of light of the light guide plate (array direction of the light sources) is defined as the X direction, the light guide direction of light of the light guide plate is defined as the Y direction, and the normal direction of the light emitting surface is defined as the Z direction, the polarized light component that vibrates in the YZ plane may be referred to as the P-polarized light component, and the polarized light component that vibrates in the direction vertical to the YZ plane may be referred to as the S-polarized light component.

The light guide plate 310 is configured to cause, for example, light from the light source unit 320 to enter from the side surface (light incident surface) opposed to the light source unit 320, and to emit, from the viewer-side surface (light emitting surface), first directivity light which has directivity of maximum intensity in a first direction at a predetermined angle with respect to the normal direction of the light emitting surface in a plane approximately parallel to the light guide direction of light, and which is polarized light containing a polarized light component that vibrates in the plane at a high ratio. In the illustrated example, a columnar lens pattern is formed on each of the back surface side and the viewer side of the light guide plate. However, as long as desired light can be emitted, the lens pattern may be formed on only any one of the sides. In addition, the lens pattern is not limited to a columnar shape, and may be, for example, a pattern in which columnar, pyramidal, or hemispherical protrusions are dotted.

The light source unit 320 is formed of, for example, the plurality of point light sources 321 arrayed along the side surface of the light guide plate. As the point light source, a light source configured to emit light having high directivity is preferred, and for example, an LED may be used.

The prism sheet 330 is configured to, for example, emit the second directivity light which has directivity in an approximately normal direction of the light emitting surface of the prism sheet while substantially maintaining the polarization state of the first directivity light. In the illustrated example, the prism sheet 330 includes a prism portion in which a plurality of columnar unit prisms that are convex toward the light guide plate side are arrayed.

The reflecting plate 340 has a function of reflecting light released from the back surface side or the like of the light guide plate and returning the light into the light guide plate. As the reflecting plate, there may be used, for example, a sheet formed of a material having high reflectance, such as a metal (for example, a specularly reflective silver foil sheet or a thin metal plate having aluminum or the like vapor-deposited thereon), a sheet including a thin film (for example, a metal thin film) formed of a material having high reflectance as a surface layer (for example, a PET substrate having silver vapor-deposited thereon), a sheet having mirror reflectivity in which two or more kinds of thin films having different refractive indices are laminated as a multilayer, and a diffusely reflective white foamed polyethylene terephthalate (PET) sheet. As the reflecting plate, a reflecting plate that enables so-called mirror reflection is preferably used from the viewpoint of improving a light condensing property and light use efficiency.

For details of the light guide plate 310, the light source unit 320, and the prism sheet 330, for example, JP 2013-190778 A and JP 2013-190779 A may be referred to, the descriptions of which are incorporated herein by reference in their entirety.

In addition, the surface light source device configured to emit, from the light emitting surface, light which has directivity in the approximately normal direction of the light emitting surface, and which contains the linearly polarized light component that vibrates in a specific direction at a high ratio is not limited to the above-mentioned illustrated example, and any appropriate surface light source device may be used. For example, a surface light source device described in JP 09-54556 A, or a surface light source device using, for example, a polarized light beam splitter or a polarized light conversion element (e.g., a device described in JP 2013-164434 A, JP 2005-11539 A, JP 2005-128363 A, JP 07-261122 A, JP 07-270792 A, JP 09-138406 A, or JP 2001-332115 A) may be used.

E. Production Method for Liquid Crystal Display Apparatus

The liquid crystal display apparatus may be produced, for example, by arranging optical members, such as a liquid crystal panel, a light control layer, and a surface light source device, in a housing so as to have a predetermined configuration. A surface light source device configured to emit, from a light emitting surface, light which has directivity in an approximately normal direction of the light emitting surface, and which contains a linearly polarized light component that vibrates in a specific direction at a high ratio is typically arranged so that the vibration direction of the linearly polarized light component (preferably, a P-polarized light component) is parallel to the transmission axis of a back surface-side polarizing plate of a liquid crystal panel. With this, the improvement of light use efficiency and narrower viewing angle display can be achieved. Specifically, the surface light source device illustrated in FIG. 3 is preferably arranged so that the light guide direction of the light guide plate (in other words, the vibration direction of the P-polarized light component to be emitted or the Y direction) is parallel to the transmission axis of the back surface-side polarizing plate of the liquid crystal display panel.

In production of the liquid crystal display apparatus, the respective optical members may be arranged close to or in contact with each other without being bonded to each other via an adhesion layer. Alternatively, the adjacent optical members may be bonded to each other via the adhesion layer as required. The adhesion layer is typically an adhesive layer or a pressure-sensitive adhesive layer.

In one embodiment, a liquid crystal display apparatus may be obtained by arranging a light control layer on a viewer side of the surface light source device in advance to produce a backlight unit and arranging a liquid crystal panel on a viewer side (light control layer side) of the backlight unit.

In another embodiment, a liquid crystal display apparatus may be obtained by bonding a light control layer to a back surface side of a liquid crystal panel in advance to integrate the light control layer with the liquid crystal panel and arranging the surface light source device on a back surface side (light control layer side) of the liquid crystal panel integrated with the light control layer.

F. Display Characteristics of Liquid Crystal Display Apparatus

In one embodiment, in the liquid crystal display apparatus, at the time of narrow viewing angle setting, the brightness in an oblique direction is desirably less than 3%, more desirably less than 2%, still more desirably less than 1% with respect to the brightness in a front direction. For example, when, regarding the emitting surface (display screen) of the liquid crystal display apparatus, the direction parallel to the light guide direction of light of the light guide plate (Y direction of FIG. 3) is defined as the vertical direction, and the direction perpendicular to the light guide direction of light of the light guide plate (X direction of FIG. 3) is defined as the horizontal direction, it is preferred that the brightness at a polar angle of 40° or more be 2% or less with respect to the brightness in the front direction (polar angle: 0°) in any one or both of the horizontal and vertical directions within the emitting surface, and it is more preferred that the brightness at a polar angle of 50° or more be 1% or less with respect to the brightness in the front direction (polar angle: 0°) in the horizontal direction within the emitting surface. Meanwhile, at the time of wide viewing angle setting, the brightness at a polar angle of 40° is preferably 5% or more with respect to the brightness in the front direction, more preferably 2 or more and 20 or less times as large as that at the time of narrow viewing angle setting. When the brightness at the time of wide viewing angle setting falls within the above-mentioned ranges, it is possible to ensure practically acceptable visibility and wide viewing angle characteristics under a situation in which it is not required to consider peeping or the like.

G. Backlight Unit

A backlight unit includes the surface light source device. In one embodiment, the backlight unit has a configuration which further includes the light control layer and in which the light control layer is arranged on the light emitting surface side of the surface light source device. In this case, the light control layer may be bonded to the light emitting surface (for example, a viewer-side surface of a prism sheet) of the surface light source device via an adhesion layer.

EXAMPLES

The present invention is specifically described below by way of Examples, but the present invention is not limited to these Examples. Test and evaluation methods in Examples are as described below. In addition, "parts" and "%" in Examples are weight-based units unless otherwise stated.

(1) Front Retardation

A front retardation was measured at a wavelength of 590 nm and 23° C. through use of "AxoScan" (product name) manufactured by Axometrics.

(2) Thickness

A thickness was measured through use of a digital micrometer (manufactured by Anritsu Corporation, product name "KC-351C").

Example 1

(Light Control Layer)

On one surface of a cycloolefin-based transparent substrate (norbornene-based resin film (manufactured by Zeon Corporation, product name "ZF-16"), thickness: 40 µm, Re[590]: 5 nm), a transparent electrode layer (ITO layer) was formed by sputtering to obtain a transparent conductive film having a configuration of [COP substrate/transparent electrode layer].

An application liquid containing 40 parts of a liquid crystal compound (manufactured by HCCH, product name "HPC854600-100") and 60 parts (solid content) of a UV-curable resin (manufactured by Norland, product name "NOA65") were applied onto the surface of the first transparent conductive film on the transparent electrode layer side, to thereby form an application layer. Next, the second transparent conductive film was laminated on the application layer so that the transparent electrode layer was opposed to the application layer. The obtained laminate was irradiated with W light to cure the UV-curable resin, to thereby obtain a light control layer A of a normal mode having a thickness of about 90 µm (configuration: first COP substrate/first transparent electrode layer/composite layer/second transparent electrode layer/second COP substrate).

(Liquid Crystal Panel)

A liquid crystal panel (configuration: viewer-side polarizing plate/liquid crystal cell of IPS mode/back surface-side polarizing plate) mounted on a notebook computer (manufactured by Dell, product name "Inspiron 13 7000") was used.

(Surface Light Source Device)

A light guide plate, a plurality of LED light sources arranged at predetermined intervals along one side surface in a long side direction of the light guide plate, and a reflecting plate arranged on a back surface side of the light guide plate were removed from a notebook computer (manufactured by HP, product name "EliteBook ×360"), and a prism sheet was arranged on a viewer side of the light guide plate so that a prism shape was convex toward the back surface side (in other words, the light guide plate side), to thereby produce a surface light source device as illustrated in FIG. 3. As the prism sheet, a prism sheet as illustrated in FIG. 3 was produced by filling a UV-curable urethane acrylate resin serving as a material for a prism into a predetermined mold through use of, as a substrate portion film, a stretched film (Re[590]: 6,000 nm) of a PET film (manufactured by Toyobo Co., Ltd., "A4300", thickness: 100 µm) and irradiating the UV-curable urethane acrylate resin with W light to cure the material for a prism on one surface of the substrate portion film. Each of unit prisms was a triangular prism, and a sectional shape thereof parallel to the array direction and parallel to the thickness direction was a scalene triangle. An angle formed by the ridge line of the prisms and the slow axis of the substrate portion film was 80°.

The obtained surface light source device was configured to emit, from a light emitting surface (viewer-side surface of the prism sheet), light which had directivity in an approximately normal direction of the light emitting surface, and which contained a linearly polarized light component (P-polarized light component) that vibrated in a direction (Y direction in the case of emitted light in a front direction) parallel to a light guide direction of light of the light guide plate (direction perpendicular to the array direction of the LED light sources) at a ratio of 56% or more.

(Liquid Crystal Display Apparatus)

The liquid crystal panel, the light control layer, and the surface light source device were arranged in the stated order from the viewer side to produce a liquid crystal display apparatus A. In this case, each member was arranged so that the transmission axis of the back surface-side polarizing plate of the liquid crystal panel and the vibration direction of the linearly polarized light component contained in the emitted light from the surface light source device at a ratio of 56% or more were parallel to each other.

Comparative Example 1

(Production of Light Control Layer)

A light control layer B of a normal mode having a thickness of about 110 μm (configuration: first PET substrate/first transparent electrode layer/composite layer/second transparent electrode layer/second PET substrate) was obtained in the same manner as in Example 1 except that a polyester-based resin substrate (PET film, (manufactured by Toyobo Co., Ltd., product name "A4300"), thickness: 50 μm, Re[590]: 2,500 nm) was used as a transparent substrate.

(Liquid Crystal Display Apparatus)

A liquid crystal display apparatus B was produced in the same manner as in Example 1 except that the light control layer B was used instead of the light control layer A.

Reference Example 1

(Production of Light Control Layer)

A light control layer C of a normal mode having a thickness of about 390 μm (configuration: first PET substrate/first transparent electrode layer/composite layer/second transparent electrode layer/second PET substrate) was obtained in the same manner as in Example 1 except that a polyester-based resin substrate (PET film, manufactured by Toyobo Co., Ltd., product name "A4300", thickness: 188 μm, Re[590]: 12,000 nm) was used as a transparent substrate.

(Production of Liquid Crystal Display Apparatus)

A liquid crystal display apparatus C was produced in the same manner as in Example 1 except that the light control layer C was used instead of the light control layer A.

<<Evaluation of Display Characteristics>>

Figure 4A:
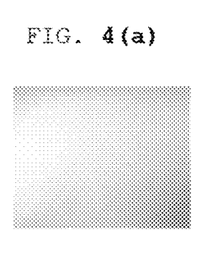
FIGS. 4(a) to 4(c) are each a photograph obtained by photographing a display screen at the time of white display of the liquid crystal display apparatus at the time of narrow viewing angle setting.
Figure 4B:
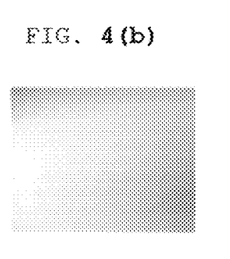
Figure 4C:
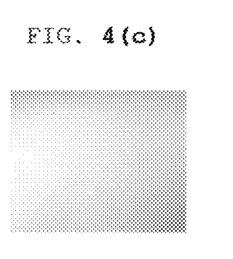

In each of FIGS. 4(a) to 4(c), there is shown a photograph (15 cm wide by 14 cm long, shooting distance=60 cm) of a display screen (white display) when a narrow viewing angle is set by setting the light control layer in the light transmitting state in the above-mentioned liquid crystal display apparatus. FIG. 4(a) corresponds to the liquid crystal display apparatus A obtained in Example 1. FIG. 4(b) corresponds to the liquid crystal display apparatus B obtained in Comparative Example 1. FIG. 4(c) corresponds to the liquid crystal display apparatus C obtained in Reference Example 1.

As shown in FIGS. 4(a) to 4(c), in the liquid crystal display apparatus B of Comparative Example 1, striped color unevenness extending in the horizontal direction of the screen occurred, whereas in the liquid crystal display apparatus A of Example 1, no color unevenness was recognized. In addition, also in the liquid crystal display apparatus C of Reference Example 1 using the transparent substrate having a large thickness, no color unevenness was recognized.

Figure 5A:
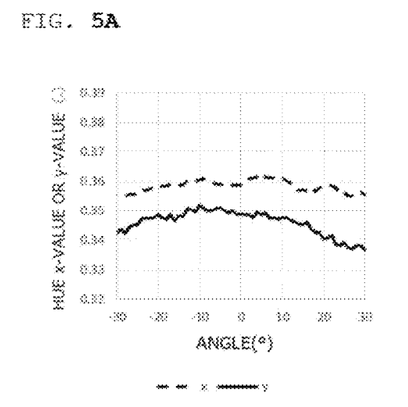
FIG. 5A is a graph for showing changes in hue x-value and y-value when a polar angle is changed in a horizontal direction of the display screen in a liquid crystal display apparatus A at the time of narrow viewing angle setting.
Figure 5B:
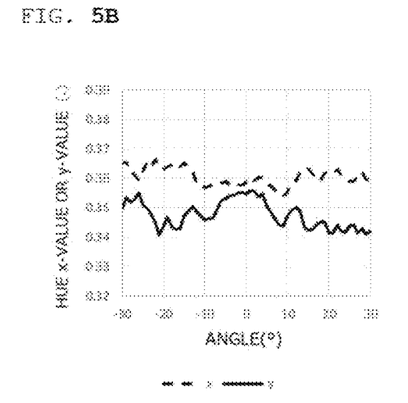
FIG. 5B is a graph for showing changes in hue x-value and y-value when the polar angle is changed in the horizontal direction of the display screen in a liquid crystal display apparatus B at the time of narrow viewing angle setting.
Figure 5C:
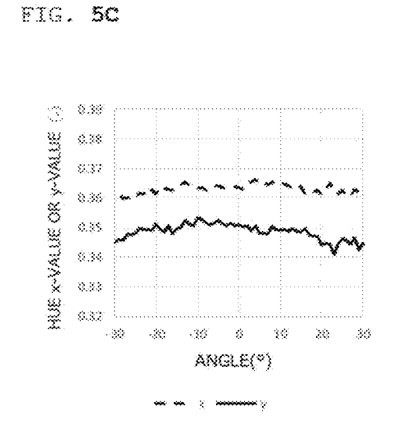
FIG. 5C is a graph for showing changes in hue x-value and y-value when the polar angle is changed in the horizontal direction of the display screen in a liquid crystal display apparatus C at the time of narrow viewing angle setting.

In addition, in each of FIG. 5A to FIG. 5C, there are shown changes in hue x-value and y-value when a polar angle is changed from the front direction to the horizontal direction (when the polar angle is changed along a long side direction of the screen) at a center position of the display screen (white display) when a narrow viewing angle is set by setting the light control layer in the light transmitting state in the above-mentioned liquid crystal display apparatus. FIG. 5A corresponds to the liquid crystal display apparatus A obtained in Example 1. FIG. 5B corresponds to the liquid crystal display apparatus B obtained in Comparative Example 1. FIG. 5C corresponds to the liquid crystal display apparatus C obtained in Reference Example 1. The hue x-value and y-value were measured through use of an angle-brightness meter (manufactured by AUTRONIC-MELCHERS, product name "Conoscope").

As shown in FIG. 5A to FIG. 5C, an abrupt change in hue occurred with respect to a change in angle in the liquid crystal display apparatus B of Comparative Example 1, whereas no abrupt change in hue was observed in the liquid crystal display apparatus A of Example 1. In addition, also in the liquid crystal display apparatus C of Reference Example 1 using the transparent substrate having a large thickness, no abrupt change in hue occurred. Thus, it is understood that, in the liquid crystal display apparatus B of Comparative Example 1, the hue of the screen is changed along with a change in viewing angle, and this change is observed as unevenness, whereas in the liquid crystal display apparatus A of Example 1, such a problem is solved.

REFERENCE SIGNS LIST

1 liquid crystal display apparatus
100 light control layer
200 liquid crystal panel
300 surface light source device
310 light guide plate
320 light source unit
330 prism sheet
340 reflecting plate

The invention claimed is:

1. A liquid crystal display apparatus, comprising in an order from a viewer side:
   a liquid crystal panel;
   a light control layer; and
   a surface light source device,
   wherein the liquid crystal panel includes: a liquid crystal cell; a viewer-side polarizing plate arranged on the viewer side of the liquid crystal cell; and a back surface-side polarizing plate arranged on an opposite side to the viewer side of the liquid crystal cell,
   wherein the light control layer includes in an order from the viewer side: a first transparent substrate; a first transparent electrode layer; a composite layer of a polymer matrix and a liquid crystal compound; a second transparent electrode layer; and a second transparent substrate,
   wherein the first transparent substrate and the second transparent substrate each independently have a thickness of 70 μm or less,
   wherein the first transparent substrate and the second transparent substrate each independently have a front retardation at a wavelength of 590 nm of 50 nm or less,
   wherein the surface light source device is configured to emit, from a light emitting surface opposed to the light control layer, light which has directivity in an approximately normal direction of the light emitting surface, and which contains a linearly polarized light component that vibrates in a specific direction at a high ratio, wherein a vibration direction of the linearly polarized light component is approximately parallel to a transmission axis of the back surface-side polarizing plate, and wherein the light control layer has a parallel light transmittance of from 80% to 99% in a light transmitting state.

2. The liquid crystal display apparatus according to claim 1, wherein the first transparent substrate and the second transparent substrate are each formed of a material containing a cycloolefin-based resin.

3. The liquid crystal display apparatus according to claim 1, wherein a driving mode of the liquid crystal cell is an IPS mode or an FFS mode.

4. The liquid crystal display apparatus according to claim 1, wherein the surface light source device includes a light source unit, and a light guide plate configured to cause light from the light source unit to enter from a side surface opposed to the light source unit, and to emit the light from a viewer-side surface, and wherein the linearly polarized light component vibrates in a plane approximately parallel to a light guide direction of the light of the light guide plate.

5. The liquid crystal display apparatus according to claim 1, wherein the first transparent substrate and the second transparent substrate each independently have a front retardation at a wavelength of 590 nm of 10 nm or less.

6. The liquid crystal display apparatus according to claim 1, wherein the first transparent substrate and the second transparent substrate each independently have a thickness of 20 μm to 60 μm.

7. The liquid crystal display apparatus according to claim 1, wherein a total thickness of the light control layer is from 40 μm to 150 μm.

8. The liquid crystal display apparatus according to claim 1, wherein the light control layer has a parallel light transmittance of from 83% to 99%.

9. The liquid crystal display apparatus according to claim 1, wherein the light control layer has a haze of 10% or less in the light transmitting state and has a haze of from 50% to 99% in a light scattering state.

10. The liquid crystal display apparatus according to claim 1, wherein the light control layer has a total light transmittance of from 88% to 95% in both the light transmitting state and a light scattering state.

11. The liquid crystal display apparatus according to claim 1, wherein a refractive index adjusting layer is formed between the first transparent substrate and the first transparent electrode layer and between the second transparent substrate and the second transparent electrode layer, respectively.

* * * * *